United States Patent
Burstein et al.

(10) Patent No.: US 11,762,785 B2
(45) Date of Patent: Sep. 19, 2023

(54) PERIPHERAL COMPONENT INTERCONNECT ATTRIBUTES SHARED USING ADDRESS BITS

(71) Applicant: MELLANOX TECHNOLOGIES, LTD., Yokneam (IL)

(72) Inventors: Idan Burstein, Akko (IL); Ilan Pardo, Ramat-Hasharon (IL); Yamin Friedman, Haifa (IL); Michael Cotsford, Bellingham, MA (US); Mark Rosenbluth, Uxbridge, MA (US); Hillel Chapman, Ramat Hashofet (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 94 days.

(21) Appl. No.: 17/306,033

(22) Filed: May 3, 2021

(65) Prior Publication Data

US 2022/0350756 A1  Nov. 3, 2022

(51) Int. Cl.
*G06F 13/16* (2006.01)
*G06F 13/38* (2006.01)
*G06F 13/42* (2006.01)
*G06F 12/0811* (2016.01)
*G06F 15/78* (2006.01)
*G06F 12/02* (2006.01)

(52) U.S. Cl.
CPC ...... *G06F 13/1668* (2013.01); *G06F 12/0246* (2013.01); *G06F 12/0811* (2013.01); *G06F 13/382* (2013.01); *G06F 13/4221* (2013.01); *G06F 15/7807* (2013.01); *G06F 2213/0026* (2013.01)

(58) Field of Classification Search
CPC ............... G06F 13/1668; G06F 13/382; G06F 13/4221; G06F 12/0246; G06F 12/0811; G06F 15/7807; G06F 2213/0026
USPC .......................................................... 711/154
See application file for complete search history.

(56) References Cited

U.S. PATENT DOCUMENTS

| | | | | |
|---|---|---|---|---|
| 5,838,934 | A * | 11/1998 | Boutaud | G06F 13/28 710/316 |
| 9,026,682 | B2 * | 5/2015 | Ajanovic | G06F 13/4068 710/5 |
| 2004/0088460 | A1 * | 5/2004 | Poisner | G06F 13/24 710/260 |
| 2008/0162762 | A1 * | 7/2008 | Neiger | G06F 13/24 710/261 |
| 2010/0095032 | A1 * | 4/2010 | Harriman | G06F 13/1626 710/100 |
| 2018/0089115 | A1 * | 3/2018 | Schmisseur | G06F 13/4282 |
| 2019/0102326 | A1 * | 4/2019 | Agarwal | G06F 13/161 |
| 2019/0114281 | A1 * | 4/2019 | Li | G06F 13/4027 |
| 2019/0188173 | A1 * | 6/2019 | Otani | G06F 13/1652 |

(Continued)

*Primary Examiner* — Christopher B Shin
(74) *Attorney, Agent, or Firm* — Sheridan Ross P.C.

(57) ABSTRACT

A system and method are provided. In one example, a system is disclosed that includes a memory device and a first interface configured to connect with a first external device. The interface may include a device side that enables a first data exchange with the first external device and a system side that enables a second data exchange with the memory device, where the system side further enables an exchange of platform hints between the first interface and the memory device. The system may also include a hinting unit that populates the platform hints in an address bit.

20 Claims, 5 Drawing Sheets

(56) References Cited

U.S. PATENT DOCUMENTS

| | | | |
|---|---|---|---|
| 2020/0192802 A1* | 6/2020 | Ng | G06F 12/0811 |
| 2020/0226091 A1* | 7/2020 | Harriman | G06F 13/4282 |
| 2020/0242040 A1* | 7/2020 | Iyer | G06F 12/0891 |
| 2020/0371914 A1* | 11/2020 | Wang | G06F 12/0884 |

* cited by examiner

PERIPHERAL COMPONENT INTERCONNECT ATTRIBUTES SHARED USING ADDRESS BITS

FIELD OF THE DISCLOSURE

The present disclosure is generally directed toward data storage devices and, in particular, toward sharing data between devices.

BACKGROUND

Peripheral Component Interconnect Express (PCIe) is a high-speed serial computer expansion bus standard. PCIe was developed and continues to develop in an effort to improve or replace older bus standards. Other serial communication standards such as Universal Serial Bus (USB) standards establish specifications for cables, connectors, and protocols that facilitate machine-to-machine communications.

BRIEF SUMMARY

Newer PCIe protocol versions (e.g., version 3, version 4, etc.) have incorporated an optional attribute field called a Steering Tag (ST) field that stores an attribute or platform hint to be used within memory access requests. The ST field allows a device to convey platform hints to be applied to the memory access request. The actual usage of such hints is platform dependent and not a requirement of current PCIe specifications. Examples of known platform hint usage are to specify a target cache for data to be written, expected temporal usage of the data, and other hints that can help optimize data transfers or memory usage.

Another optional feature provided by PCIe is a Relaxed Ordering (RO) field, which is used to store a hint specifying whether a transaction should follow strict ordering rules or whether the transaction is allowed to use relaxed ordering. Other examples of fields that can be used to optimize performance, but are not required, include Last Level Cache (LLC) fields, stashing fields, etc.

Although defined by PCIe specifications, because usage of the certain fields (e.g., ST field, RO field, LLC field, stashing field, and others) is optional, there are still many devices in use and being developed that do not support use of the optional fields. Thus, previous data transaction methods are forced to either use devices supporting the optional fields or suffer sub-optimal performance. Embodiments of the present disclosure aim to share and use indications supported by these optional fields (e.g., ST field, RO field, LLC field, stashing field, etc.) even when non-supporting devices are involved. Enabling use of the newer fields and platform hints provided therein even for devices that do not natively support the platform hints allows the overall system performance to be improved when older or non-supporting device are involved in the data transaction.

In an illustrative example, a system is disclosed that includes: a memory device and a first interface configured to connect with a first external device, where the first interface includes: a device side that enables a first data exchange with the first external device; a system side that enables a second data exchange with the memory device, wherein the system side further enables an exchange of platform hints between the first interface and the memory device; and a hinting unit that populates the platform hints in an address bit.

In another example, a System on a Chip (SoC) is disclosed that includes: a memory device; a first interface that is configured to communicate with a first device using a serial communication protocol, where the first interface enables the first device to write data to the memory device, and where the first interface is configured to transfer a platform hint to the memory device via an address bit; and a second interface that is configured to communicate with a second device using the serial communication protocol, where the second interface enables the second device to read the data written to the memory device by the first device.

In yet another example, a method of facilitating data transfers between a first device and a second device is disclosed that includes: connecting the first device to a first interface; connecting the second device to a second interface; receiving data from the first device via the first interface; storing the data in a memory device; transferring a platform hint to the memory device, where the platform hint is transferred to the memory device through the first interface using an address bit; and enabling the second device to retrieve the data stored in the memory device.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
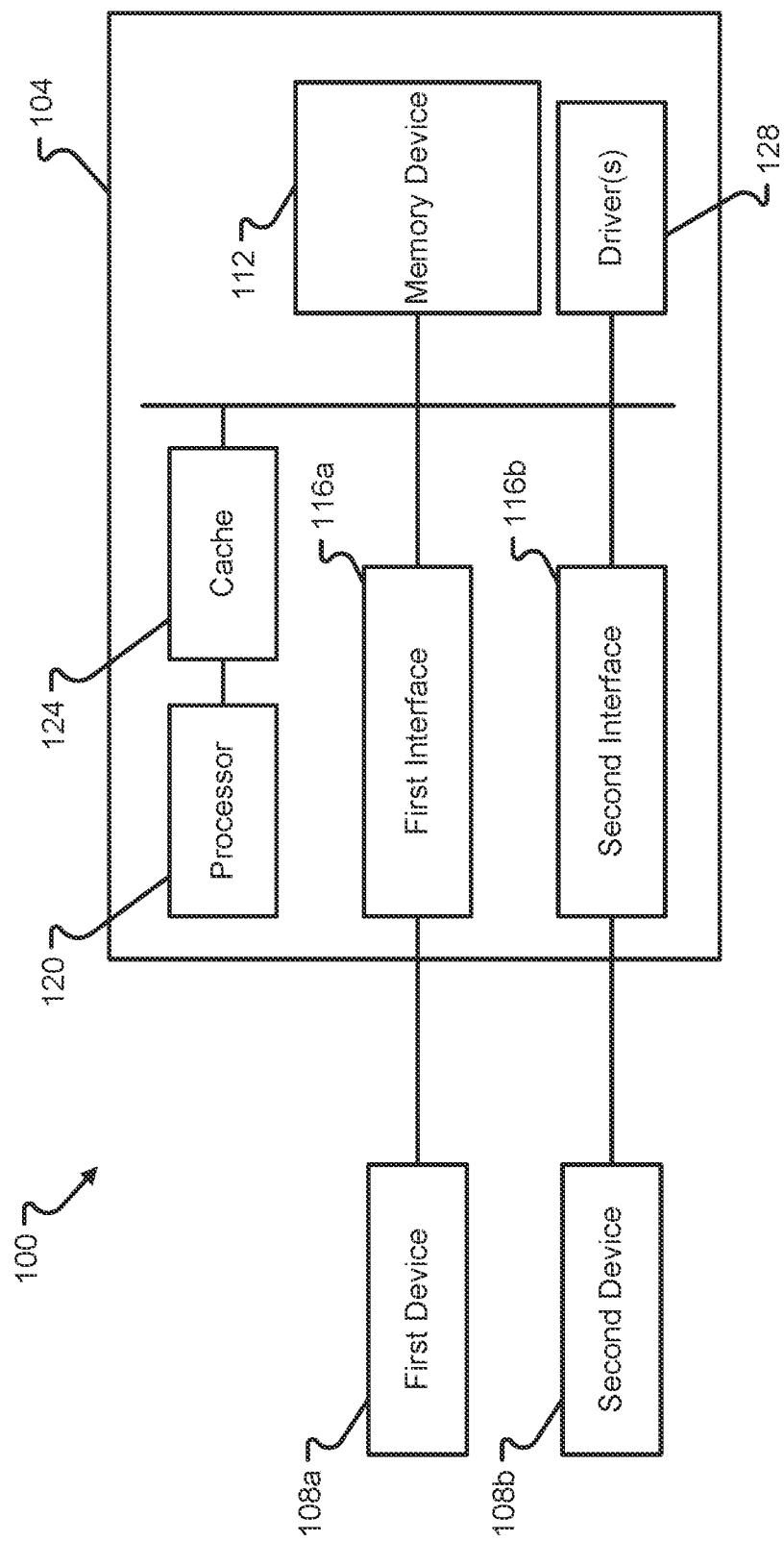
FIG. 1 is a block diagram illustrating a computing environment in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems and methods for facilitating data transactions and transfers between devices will be described. Embodiments of the present disclosure solve the lack of device support for particular attribute fields (e.g., platform hinting attribute fields like an LLC field, a stashing hint field, a ST field, a RO field, etc.) by exploiting unused address bits to convey the attributes. As used herein, the attributes conveyed in an unused address bit or multiple unused address bits may include platform hints. Platform hints, for example, may correspond to memory access hints or other pieces of information that can be used to describe a device involved in a data transaction, to describe capabilities of a device involved in a data transaction, to describe an interface involved in a data transaction, to describe capabilities of an interface involved in a data transaction, to describe an optimization parameter to be used in a data transaction (e.g., to specify a target cache for written data, to specify an expected temporal usage of written data, etc.), or to describe combinations thereof.

Certain embodiments contemplate usage of particular unused address bits, which may correspond to upper address bits. Illustratively and without limitation, PCIe interconnect and PCIe devices currently support a 64-bit address size. Even though most PCIe devices do support full 64-bit addresses, typical data transaction platforms only map a subset of the address range. For instance, many currently available platforms utilize between 40 to 56 bits for addressing even though 64 bits are available for addressing.

Embodiments of the present disclosure propose exploiting the unused address bits. For example, a device driver may be provided with an ability to fill-in attributes or platform hints within the address given to a device for its use based on the driver's knowledge of the address usage. More specifically, a driver may be configured to populate address bits with platform hints or other attributes describing data payload and memory control structures. Responsive to the driver, the device hardware may be configured to transparently send the platform hints or other attributes in the full 64-bit address support without knowing the high address bits are being used to convey information other than addressing information (e.g., platform hints or other attributes). In addition to non-supported standard features, embodiments of the present disclosure also allow platforms to implement non-standard attribute sharing with minimal driver modifications.

Referring initially to FIG. 1, an illustrative computing environment 100 is shown in which a first device 108a is configured to participate in a data exchange or data transaction with a second device 108b. The data transaction between the first device 108a and second device 108b may be facilitated by system 104, which may also be referred to herein as a platform or System on a Chip (SoC).

The system 104 is shown to include a first interface 116a and a second interface 116b. The first interface 116a may be configured to connect, directly or indirectly, with the first device 108a. The second interface 116b may be configured to connect, directly or indirectly, with the second device 108b. In some embodiments, the first device 108a may correspond to a remote or external device with respect to the system 104, meaning that the first device 108a may connect with the first interface 116a via one or multiple cables, links, etc. In some embodiments, the first device 108a may correspond to a remote device that connects with the first interface 116a via a distributed communication network. In some embodiments, the first device 108a may correspond to a peripheral device that attaches directly to the first interface 116a or that attaches to the first interface 116a via a peripheral interconnect cable or card. The nature of the first interface 116a may depend upon the nature of the first device 108a being used. Conversely, the nature of the first device 108a being used may depend upon the nature of the first interface 116a.

The second device 108b may correspond to a same or different type of device as the first device 108a. For instance, the second device 108b may correspond to a remote or external device with respect to the system 104, meaning that the second device 108b may connect with the second interface 116b via one or multiple cables, links, etc. In some embodiments, the second device 108b may correspond to a remote device that connects with the second interface 116b via a distributed communication network. In some embodiments, the second device 108b may correspond to a peripheral device that attaches directly to the second interface 116b or that attaches to the second interface 116b via a peripheral interconnect cable or card. The nature of the second interface 116b may depend upon the nature of the second device 108b being used. Conversely, the nature of the second device 108b being used may depend upon the nature of the second interface 116b.

As mentioned above, the first device 108a and second device 108b may correspond to the same or different types of devices. As an example, the first device 108a may correspond to a peripheral device whereas the second device 108b may correspond to a remote device. As another example, both the first device 108a and second device 108b may correspond to remote devices or to peripheral devices. In some embodiments, the first interface 116a and second interface 116b may correspond to the same or different types of interfaces. As a non-limiting example, both the first interface 116a and the second interface 116b may facilitate communications between the system 104 and the devices 108a, 108b via a serial communication protocol (e.g., PICe, USB, etc.).

The system 104 is also shown to include a memory device 112 that can be shared and used to facilitate a data transfer or data transaction between the first device 108a and second device 108b. The system 104 also includes a processor 120, cache 124, and one or more drivers 128. Some or all of these components may be connected by a data bus or the like. The system 104 is illustrated as having only two interfaces 116a, 116b for ease of discussion. It should be appreciated that the system 104 may include a larger number of interfaces (e.g., two, three, four, . . . , ten, twenty, etc.). The number of interfaces provided in the system 104 can vary without departing from the scope of the present disclosure. As a non-limiting example, the system 104 can be configured to have ten or more devices attached thereto via dedicated interfaces, meaning each device is connected to the system 104 with a different interface. This means that the system 104 can be designed to support data transfers between a large number of devices. It may also be desirable to provide additional processors 120, memory devices 112, and/or driver(s) 128 to support data transfers between a larger number of devices.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), a Graphics Processing Unit (GPU), a Data Processing Unit (DPU), or plurality of processing units that are configured to execute or implement functions of the system 104. As an example, the processor 120 may be configured to execute one or more drivers 128 to operate or provide functionality to one or both interfaces 116a, 116b. The driver(s) 128 may be provided as instructions or instruction sets stored in the memory device 112 or stored in a memory device other than the memory device 112 (e.g., in memory of the processor 120).

As will be described in further detail herein, the driver(s) 128 may be executed at the processor 120. Alternatively or additionally, the driver(s) 128 may be executed by a processor of an interface (e.g., by a processor included in the first interface 116 and/or the second interface 116b). In some embodiments, a driver 128 may be associated with a particular interface (e.g., the first interface 116a or the second interface 116b). To implement a data transfer between a first device 108a and a second device 108b, the processor 120 may execute a first driver associated with the first interface 116a and a second driver associated with the second interface 116b. In this way, the processor 120 can coordinate the operations of the first interface 116a and the second interface 116b. There may also be a driver 128 associated with the memory device 112. The processor 120 may execute the driver 128 associated with the memory device 112 to facilitate data transfers or data transactions via the memory device 112.

The memory device 112 may include any type of computer memory device or collection of computer memory devices. Non-limiting examples of a memory device 112 include Random Access Memory (RAM), Read Only Memory (ROM), flash memory, Electronically-Erasable Programmable ROM (EEPROM), Dynamic RAM (DRAM), etc. The memory device 112 may be configured to store the instruction sets, driver(s) 128, and/or data being transferred between the first device 108a and the second device 108b. In situations where the memory device 112 is used to store data being transferred between the first device 108a and the second device 108b, the memory device 112 may include buffer memory or any suitable computer memory device for temporarily storing data.

The cache 124 may correspond to a memory location in or near the processor 120. The cache 124 may be configured to store any information that is regularly accessed by the processor 120 to facilitate data transfers. In some embodiments, the cache 124 may be positioned between the processor 120 and the data bus of the system 104.

Figure 2:
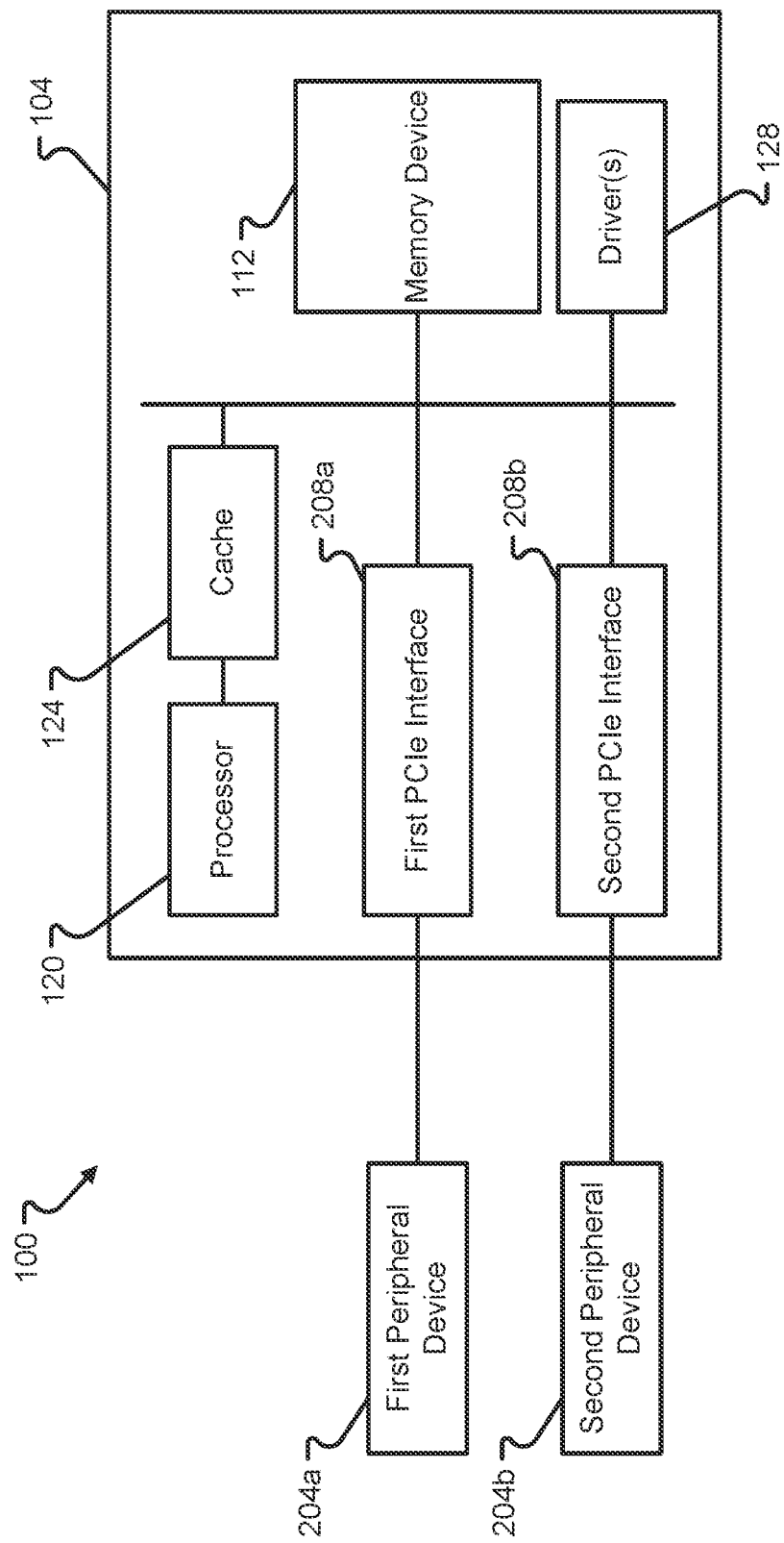
FIG. 2 is a block diagram illustrating another example of a computing environment in accordance with at least some embodiments of the present disclosure.

With reference now to FIG. 2, another example of a computing environment will be described in accordance with at least some embodiments of the present disclosure. The computing environment of FIG. 2 illustrates the first device 108a as a first peripheral device 204a and the second device 108b as a second peripheral device 204b. The system 104 is shown to include interfaces that are particularly suited to support the first peripheral device 204a and the second peripheral device 204b. More specifically, the system 104 is shown to include a first PCIe interface 208a and a second PCIe interface 208b. The first PCIe interface 208a may be configured to connect the first peripheral device 204a to the system 104. The second PCIe interface 208b may be configured to connect the second peripheral device 204b to the system 104.

Although the system 104 is shown as having two PCIe interfaces 208a, 208b in FIG. 2, it should be appreciated that a system 104 can be configured to have a greater or lesser number of PCIe interfaces without departing from the scope of the present disclosure. Furthermore, the system 104 may be configured to include one or many PCIe interfaces as well as one or many other interfaces (e.g., non-PCIe interfaces).

Figure 3:
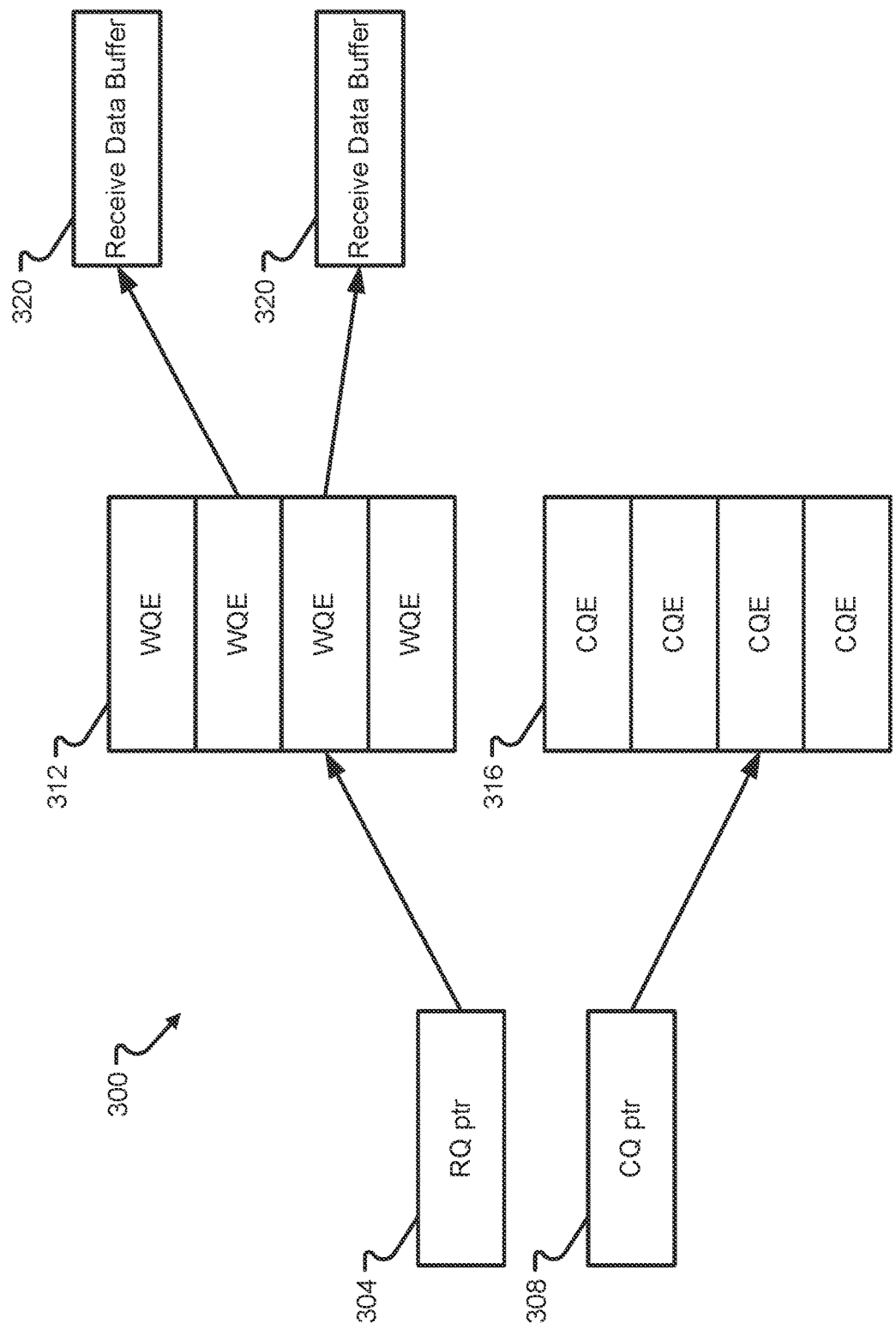
FIG. 3 is a block diagram illustrating a data structure used in accordance with at least some embodiments of the present disclosure.

With reference now to FIG. 3, an illustrative data structure 300 used to facilitate a data transfer or data transaction will be described in accordance with at least some embodiments of the present disclosure. The data structure 300 described herein is illustrative and may be used to facilitate a data transfer or data transaction between a first device 108a and a second device 108b. Alternatively or additionally, the data structure 300 described herein may be used to facilitate a data transfer or data transaction between a first peripheral device 204a and a second peripheral device 204b.

The data structure 300 is shown to include a receive queue pointer (RQ ptr) 304 and a completion queue pointer (CQ ptr) 308. The RQ ptr 304 may be used to store data that points (e.g., a link, pointer, reference, etc.) to one or more work queue elements (WQEs) 312 in a receive queue (RQ). The CQ ptr 308 may be used to store data that points (e.g., a link, pointer, reference, etc.) to one or more completion queue elements (CQEs) 316 in a completion queue (CQ). Each of the WQEs 312 may contain data that points (e.g., a link, pointer, reference, etc.) to a receive data buffer 320. A receive data buffer 320 may correspond to a memory location or particular sub-component of memory device 112.

The data structure 300 may be used by the processor 120 to facilitate data transfers or data transactions. In some embodiments, the data structure 300 may be used by the first device 108a to transfer data to the second device 108b. In this example, the first device 108a may read a WQE 312 and write data into one of the data buffers 320 using the pointer read from the WQE 312. After the data has been written to the data buffer 320 by the first device 108a, then the first device 10a may write a completion record in a CQE 316 that is associated with the data buffer 320 in which the data was just written.

The processor 120 may then obtain the CQE 316 associated with the data buffer 320 that just received the data from the first device 108a and generate appropriate controls for the second device 108b to read the data from the data buffer 320. In this example, the system 104 may place the data written to the data buffer 320 into the shared memory device 112 while placing the CQE 316 associated with the data buffer 320 into the processor's 120 local cache 124.

In a situation where the first device 108a and/or second device 108b does not support advanced hinting features (e.g., where the device is a non-supporting device that is not designed to utilize platform hints or other attributes to make data transfers more efficient), the above-described process can still be supported. To enable the data transfer as described above for a non-supporting device, the first device's 108a driver 128 is configured to write a platform hint or attribute signifying the location to access the CQE 316 in the cache 124. In some embodiments, the platform hint or attribute may be written in the high and unused bits of the CQ ptr 308. Similarly, the first device's 108a driver 128 may be configured to write a platform hint or attribute signifying a location to access the data and the platform hint or attribute may be written into the buffer pointer within the WQE 312.

As can be appreciated, certain devices may be configured to support hinting and may not need to utilize an unused address bit as described herein to share platform hints or other attributes. Accordingly, the system 104 and one or more of its interfaces 116a, 116b may be configured to switch between two modes of operation. In one mode (e.g., a first hinting mode), the driver 128 of an interface may be configured to utilize an unused address bit to share platform hints or other attributes. In another mode (e.g., a second hinting mode), the driver 128 of an interface may be configured to use defined fields (e.g., ST, RO, etc.) fields to share platform hints or other attributes.

Figure 4:
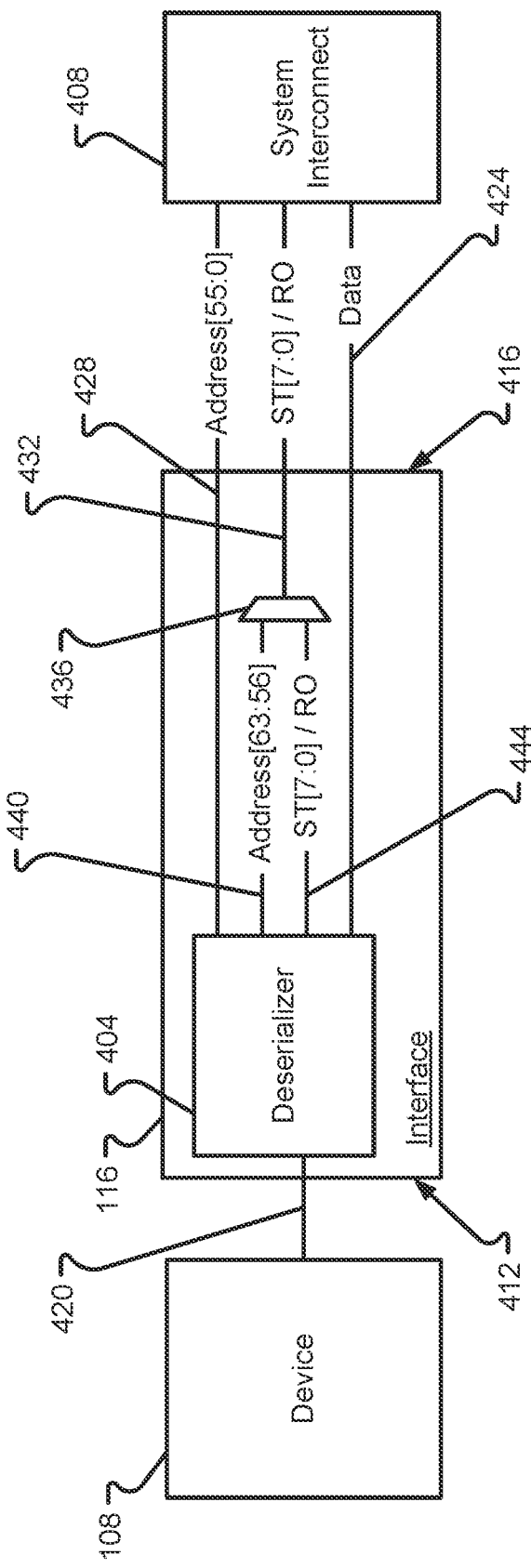
FIG. 4 is a block diagram illustrating details of an interface in accordance with at least some embodiments of the present disclosure.

Additional details of an interface 116 having the ability to operate in different hinting modes will now be described with reference to FIG. 4. In the example of FIG. 4, the interface 116 (which may correspond to an example of a first interface 116a, a second interface 116b, a first PCIe interface 208a, or a second PCIe interface 208b) is shown to include a deserializer 404 and a number of signal paths that are used to carry information between a device side 412 and a system side 416 of the interface 116. The device side 412 of the interface 116 is exposed to the device 108. The device side 412 may include mechanical and/or electrical interconnects that enable a connection directly to the device 108 or to a cable that connects to the device 108. When the device 108 is connected to the interface 412, a serial data link 420 may be established to carry data between the device 108 and the interface 116.

The system side 416 of the interface 116 may be exposed to the system interconnect 408. The system side 416 may include mechanical and/or electrical interconnects that enable the interface 116 to exchange data with other components of the system 104. In some embodiments, one or more links may be used on the system side 416 to exchange information between the interface 116 and the system interconnect 408. In some embodiments, the system side 416 may include one or more pathways to exchange data 424, address bits 428, and platform hints 432. The data 424 may be carried by a data path whereas the address bits 428 and platform hints 432 may be carried via an address path or some other bits designated to carry platform hints or attributes.

The interface 412 may include a switch 436 that is used to convey the platform hints 432 to the system interconnect 408. In some embodiments, the switch 436 may correspond to a multiplexer or switched circuitry that is configured to receive excess address bits 440 and hinting bits 444. If the device 108 is configured to utilize specialized hinting bits 444, then the switch 436 may be configured to convey the hinting bits 444 at platform hints 432 to the system interconnect 408. Alternatively, if the device 108 is not configured to utilize specialized hinting bits 444, then platform hints or attributes may be received via the excess address bits 440, which are conveyed to the system interconnect 408 via the platform hints 432. In some embodiments, operations of the switch 436 may be controlled by the driver(s) 128 of the interface 116. The driver(s) 128 may be configured to determine whether the interface 116 should be in a first configuration where excess address bits 440 are used to carry platform hints or attributes, which are then conveyed as platform hints 432 via the system side 416. The driver(s) 128 may also be configured to determine if the interface 116 can operate in a second configuration where hinting bits 444 are conveyed as platform hints 432 via the system side 416. Said another way, the driver 128 of the interface 116 may be configured to determine whether the interface 116 will be operated in a first hinting mode or a second hinting mode. In this way, the driver 128 of the interface 116 may be considered to implement a hinting unit that, in combination with the selectable operation of the switch 436, enables the interface 116 to supporting the sharing of platform hints 432 even if the device 108 does not natively support the hinting bits 444.

In some embodiments, mode selection may determine whether the switch 436 provided at the output of the deserializer 404 uses the hinting bits 444 or excess address bits 440 to populate the platform hints 432. As a non-limiting example, if the device 108 is ST/RO enabled, then the interface 116 may be configured by its driver 128 to pass the hinting bits 444, which may correspond to ST and/or RO attributes, to the system side 416 as platform hints 432. If the device 108 is not ST/RO enabled, then the interface 116 may be configured by its driver 128 to transfer platform hints contained in the excess address bits 440 as platform hints 432. It may be possible to pass any hints using the excess address bits 440. Non-limiting examples of the hints that may be conveyed with the excess address bits 440 include an LLC hint, a stashing hint, an ST attribute, and an RO attribute. The platform hints 432, whether received as hinting bits 444 or excess address bits 440, may allow the system 104 to optimize or increase efficiencies associated with a data transfer or data transaction. In some embodiments, the platform hints 432 may be used to define an amount of time that data 424 should be temporarily stored in a data buffer 320. In some embodiments, the platform hints 432 may be used to specify at least one of a target cache for written data 424 and/or an expected temporal usage of the data 424 written to the memory device 112. In some embodiments, the platform hints 432 may be used by the processor 120 to determine a manner in which to use the cache 124 and/or a manner in which to use the memory device 112.

Figure 5:
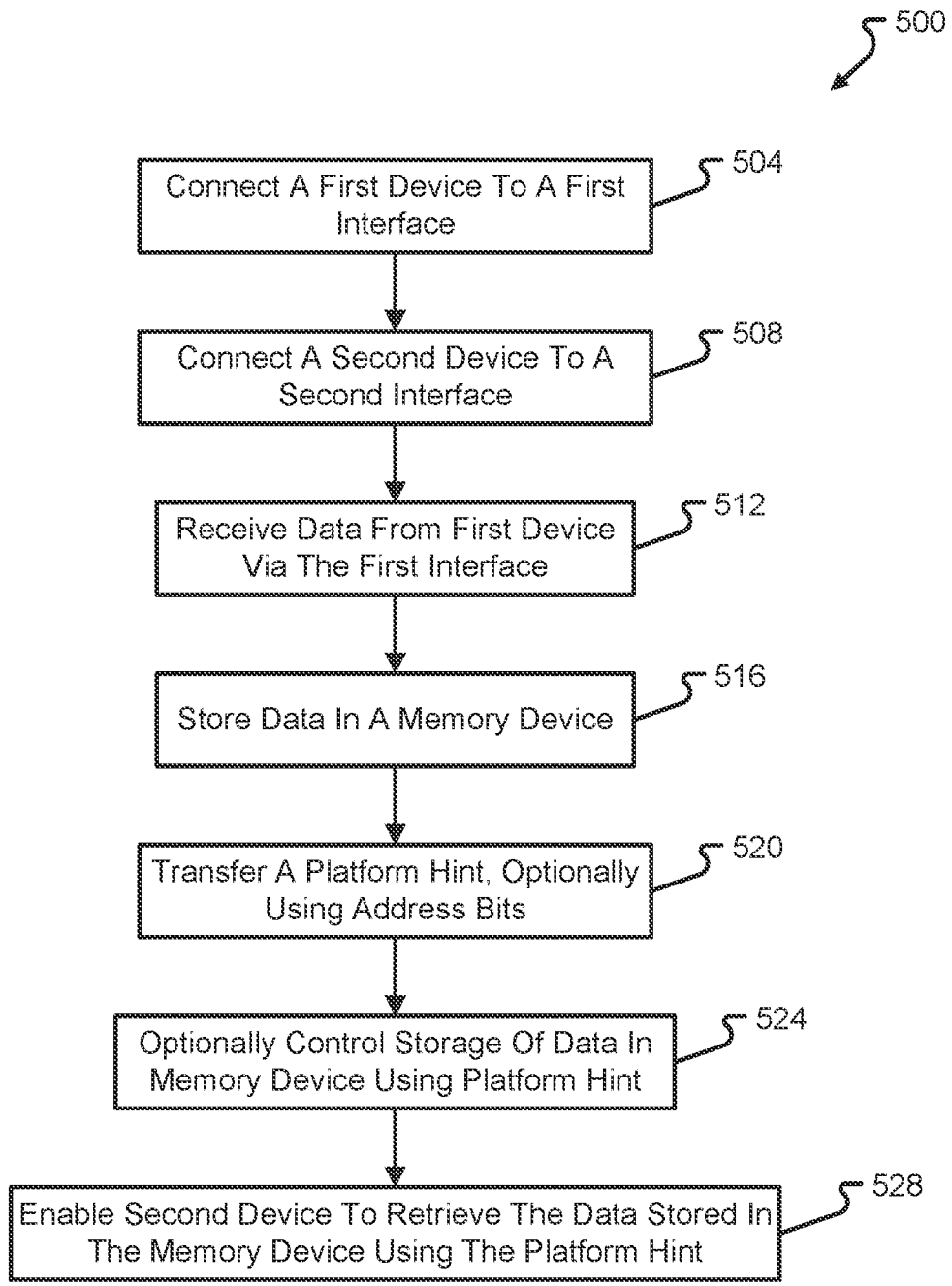
FIG. 5 is a flow diagram illustrating a method of facilitating data transfers between devices in accordance with at least some embodiments of the present disclosure.

With reference now to FIG. 5, additional details of a method 500 for facilitating data transfers between devices will be described in accordance with at least some embodiments of the present disclosure. The method 500 begins by connecting a first device 108*a* to a first interface 116*a* of a system 104 (step 504). The first device 108*a* may be connected to the first interface 116*a* electrically and/or mechanically. In some embodiments, the first device 108*a* is connected to the device side 412 of the first interface 116*a* thereby establishing a serial data link 420 between the two. The first device 108*a* may communicate with the first interface 116*a* using a serial communication protocol.

The method 500 continues by connecting a second device 108*b* to a second interface 116*b* of the system 104 (step 508). The second device 108*b* may be connected to the second interface 116*b* electrically and/or mechanically. In some embodiments, the second device 108*b* is connected to the device side 412 of the second interface 116*b* thereby establishing a serial data link 420 between the two. The second device 108*b* may communicate with the second interface 116*b* using a serial communication protocol, which may be the same as or different from the communication protocol used between the first device 108*a* and the first interface 116*a*.

The method 500 then continues when the first device 108*a* begins the process of writing data 424 to the memory device 112 where it can later be retrieved by the second device 108*b*. During this data transfer, the method 500 may include receiving data 424 from the first device 108*a* (step 512). The data 424 may be received via the first interface 116*a*. In some embodiments, the data 424 may be stored in the memory device 112 (step 516). Before, during, or after this data transfer process, the first interface 116*a* may be configured to transfer a platform hint 432 to the processor 120 (step 520). In some embodiments, the platform hint 432 may be transferred through the first interface 116*a* using excess address bits 440. In some embodiments, the platform hint 432 may be transferred through the first interface 116*a* using defined hinting bits 444.

Upon receiving the platform hints 432, the processor 120 controlling the data transfer between the first device 108*a* and the second device 108*b* may optionally use the platform hint(s) 432 to control the storage of the data 424 and/or an amount of time the data 424 is held in memory (step 524). Once the data 424 is written to the memory device 112, the second device 108*b* may be enabled to retrieve the data 424 from its storage location (step 528). In some embodiments, the second device 108*b* may use one or more of the platform hint(s) 432 to help with the retrieval of the data 424 from memory.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a memory device; and
a first interface configured to connect with a first external device, wherein the first interface comprises:
   a device side that enables a first data exchange with the first external device;
   a system side that enables a second data exchange with the memory device, wherein the system side further enables an exchange of platform hints between the first interface and the memory device;
   a deserializer that connects to the first external device;
   a switch connected to the deserializer; and
   a hinting unit that:
      determines to operate the first interface in a first hinting mode when the first external device does not support hinting features;
      determines to operate the first interface in a second hinting mode when the first external device supports hinting features;
      operates the switch to output the platform hints to the memory device using an address bit when in the first hinting mode; and
      operates the switch to output the platform hints to the memory device using a defined hinting field when in the second hinting mode.

2. The system of claim 1, wherein the platform hints comprise memory access hints.

3. The system of claim 1, wherein the address bit comprises an unused address bit.

4. The system of claim 3, wherein the first external device comprises a first peripheral device, wherein the first interface comprises a first peripheral component interconnect interface, and wherein the unused address bit corresponds to an upper address bit.

5. The system of claim 4, further comprising:
a second peripheral component interconnect interface configured to connect with a second peripheral device, wherein the second peripheral component interconnect interface comprises:
   a device side that enables a third data exchange with the second peripheral device;
   a system side that enables a fourth data exchange with the memory device, wherein the system side of the second peripheral component interconnect interface further enables an exchange of additional platform hints between the second peripheral component interconnect interface and the memory device; and
   a second hinting unit that populates the additional platform hints in an additional address bit.

6. The system of claim 1, further comprising:
a processor; and
cache memory coupled with the processor, wherein the processor utilizes the platform hints and the cache memory to facilitate data transfers between the first external device and a second external device via the memory device, and wherein the data transfers comprise data in the first data exchange and data in the second data exchange.

7. The system of claim 1, wherein the memory device comprises one or more data buffers configured to temporarily store data written thereto by the first external device for at least a predetermined amount of time.

8. The system of claim 7, wherein the predetermined amount of time is determined, at least in part, based on the platform hints.

9. The system of claim 1, wherein the platform hints comprise memory access hints, and wherein the memory access hints comprise at least one of a Last Level Cache (LLC) hint, a stashing hint, a Steering Tag (ST), and a Relaxed Ordering (RO) attribute.

10. The system of claim 1, wherein the platform hints specify at least one of a target cache for written data and an expected temporal usage of data written to the memory device by the first external device.

11. A System on a Chip (SoC), comprising:
a memory device;
a first interface that is configured to communicate with a first device using a serial communication protocol, wherein the first interface enables the first device to write data to the memory device, wherein the first interface comprises a switch, and wherein the first interface is configured to:
determine whether the first device supports hinting features;
operate the first interface in a first hinting mode when the first device does not support hinting features to cause the switch to transfer a platform hint to the memory device via an address bit; and
operate the first interface in a second hinting mode when the first device supports hinting features to cause the switch to transfer the platform hint to the memory device in a defined hinting field; and
a second interface that is configured to communicate with a second device using the serial communication protocol, wherein the second interface enables the second device to read the data written to the memory device by the first device.

12. The SoC of claim 11, wherein the platform hint comprises a memory access hint that specifies at least one of a target cache for the data written to the memory device and an expected temporal usage of the data written to the memory device.

13. The SoC of claim 11, wherein the platform hint comprises a memory access hint, wherein the first interface comprises a first peripheral component interconnect interface.

14. The SoC of claim 13, wherein the address bit corresponds to an upper address bit.

15. The SoC of claim 11, wherein the defined hinting field comprises at least one of a Steering Tag (ST) field and a Relaxed Ordering (RO) attribute field.

16. The SoC of claim 11, wherein the first device comprises at least one of a first peripheral device and a first remote device, wherein the second device comprises at least one of a second peripheral device and a second remote device, and wherein the first interface comprises a deserializer connected to the switch.

17. The SoC of claim 11, wherein the serial communication protocol comprises at least one of a Peripheral Component Interconnect express (PCIe) protocol and a Universal Serial Bus (USB) protocol.

18. A method of facilitating data transfers between a first device and a second device, the method comprising:
connecting the first device to a first interface;
connecting the second device to a second interface;
receiving data from the first device via the first interface;
storing the data in a memory device;
determining to operate the first interface in a first hinting mode when the first device does not support hinting features;
determining to operate the first interface in a second hinting mode when the first device supports hinting features;
controlling a switch of the first interface to transfer a platform hint to the memory device using an address bit when in the first hinting mode;
controlling the switch to transfer the platform hint to the memory device using a defined hinting field when in the second hinting mode; and
enabling the second device to retrieve the data stored in the memory device.

19. The method of claim 18, wherein the platform hint comprises a memory access hint, and wherein the memory access hint is used by a controller of the memory device to optimize storage of the data in the memory device.

20. The method of claim 19, wherein the memory access hint specifies at least one of a target cache for the data stored in the memory device and an expected temporal usage of the data stored in the memory device.

* * * * *